Sept. 27, 1932.  N. R. JONES ET AL  1,879,294

TUNING INDICATOR

Filed Jan. 30, 1932

Inventor:
Nevell R. Jones,
Wallace W. Dewhurst,
by *Charles W. Tullar*
Their Attorney.

Patented Sept. 27, 1932

1,879,294

UNITED STATES PATENT OFFICE

NEVELL R. JONES, OF HADDONFIELD, AND WALLACE W. DEWHURST, OF HADDON HEIGHTS, NEW JERSEY, ASSIGNORS TO GENERAL ELECTRIC COMPANY, A CORPORATION OF NEW YORK

TUNING INDICATOR

Application filed January 30, 1932. Serial No. 589,928.

Our invention relates to control means for use in connection with high frequency apparatus, and more particularly for use in connection with radio receivers, whereby the adjustments necessary to obtain the desired reception of signals may be conveniently effected.

In radio apparatus as now commonly constructed, the tuning of the resonant circuits is indicated by a scale constructed in accordance with the frequency variations determined by a test of one set of apparatus. In mass production of tuning apparatus and assembled radio apparatus, it has been found that the indications on the scale vary in different sets of apparatus. One method of obtaining accurate indication would be to calibrate a scale for each apparatus. This is highly undesirable as it would involve considerable time and expense.

Our invention has for one of its objects, to provide compensating means for automatically imparting a corrective motion to an indicator on radio apparatus, whereby accurate indication of the resonant frequencies may be obtained by an initial adjustment of said compensating means.

The novel features which we believe to be characteristic of our invention are set forth with particularity in the appended claims. Our invention itself, however, both as to its organization and method of operation, together with further objects and advantages thereof, may best be understood by reference to the following description taken in connection with the accompanying drawing in which Fig. 1 represents a radio receiver equipped with our invention; and Fig. 2 represents an embodiment of our invention.

Figure 1:
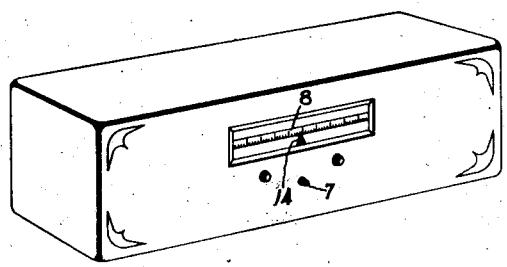

Referring to Fig. 1 of the drawing, we have shown conventionally a radio receiver to which our invention may be applied. The front panel is provided with an opening through which a longitudinal scale 8 and the indicator 14 are visible. The indicator 14 travels across the scale 8 in accordance with the tuning adjustments made with the control knob 7.

Figure 2:
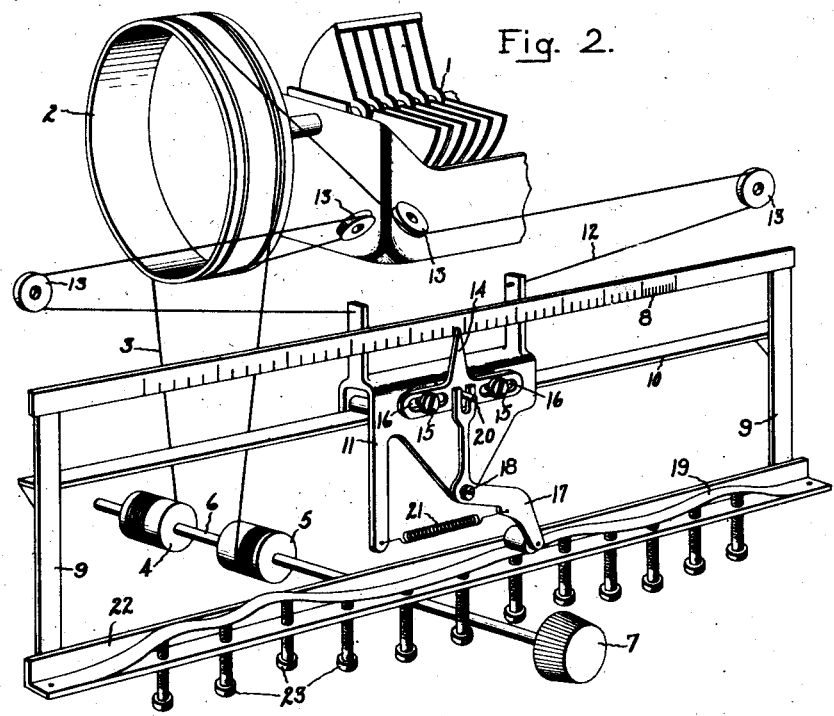

Referring to Fig. 2 of the drawing, we have shown at 1 a tuning element for radio apparatus which may be a variable capacitor or inductor to be utilized for determining the resonant frequency of an associated circuit. A driving drum 2 is attached to the shaft of the tuning element and is adapted to be rotated by means of a cable 3. The opposite ends of cable 3 are secured to the drums 4 and 5 which are mounted on a shaft 6 for rotation therewith. A knob 7 is mounted at one extremity of the shaft 6 to enable the operator by grasping knob 7 to rotate the assembly on the shaft 6 and thereby produce desired movements of the tuning element 1 to select any desired resonant frequency.

A longitudinal scale 8, graduated in frequencies to cover the range of the tuning element 1, is supported by two upright members 9. A support 10, which is arranged parallel to the scale 8, serves to support an indicator carriage 11. This indicator carriage 11 is actuated by a cable 12 which is operated by the driving drum 2. Idler pulleys 13 are arranged at suitable points to convert the rotary motion of the driving drum 2 into a longitudinal motion by means of the cable 12, and thus impart motion to the indicator carriage 11 as the tuning element 1 is rotated. An indicator 14, which cooperates with the scale 8, as shown in both figures of the drawing, is mounted upon the indicator carriage 11 for cooperation with the scale 8 to give an indication of the resonant frequency of the associated radio apparatus.

To compensate for variations in frequency between those indicated by the scale and indicator, and the actual frequencies to which the circuit is tuned by the element 1, we have provided means for imparting a corrective motion to the indicator 14. The indicator 14 is mounted on the indicator carriage by means of two screws 15 which are placed in two elongated openings 16 in the indicator. These elongated openings permit the indicator 14 to move relative to the carriage 11 in a path parallel to the carriage path. A cam follower 17 pivoted at a point 18 on the carriage 11, in cooperation with a cam surface 19, imparts a corrective motion to the indicator 14 by means of a pin 20 which is supported by the indicator 14. To insure constant contact of the cam follower 17 with the cam surface 19, a tensioning spring 21 is provided between a portion of the carriage 11 and the cam follower 17. The cam surface 19 is made of a flexible metal strip which for example may be of bronze or copper. An angle iron strip 22, which is supported from the upright members 9, is provided with a plurality of adjustable set screws 23 which support the flexible cam surface 19 and determine the shape of the cam.

To obtain accurate indication in the case of a radio receiver, the following procedure is carried out. Radio frequency energy of a known frequency is impressed upon the receiver and the receiver is tuned to resonance at that frequency. If the indication of the frequency on the scale does not correspond to the frequency of the impressed energy, the set screw 23 underneath the cam follower 17 is micrometrically adjusted until the correct frequency indication is obtained. This procedure is followed for a number of frequencies covering the tuning range of the tuning element 1. The various heights of the cam surface 19 as determined by the set screws 23 will then provide proper correction of the frequency indication for the entire scale 8 as the indicator carriage 11 is moved along the scale.

While we have shown a particular arrangement for actuating the indicator carriage 11, it is to be understood that this is merely illustratve as one of the number of means which may be arranged to actuate the indicator carriage 11 in accordance with tuning adjustments made with the control knob 7.

While we have shown a particular embodiment of our invention it will, of course, be understood that we do not wish to be limited thereto, since many modifications may be made in the mechanical arrangement shown and in the instrumentalities employed, and that we contemplate by the appended claims to cover any such modifications as fall within the true spirit and scope of our invention.

What we claim as new and desire to secure by Letters Patent of the United States, is:

1. In an indicating apparatus for an electrical circuit including a variable impedance element, the combination of means for actuating said variable impedance element, an indicating surface, a movable carriage provided with a movable indicator which cooperates with said indicating surface, means for transferring motion from said impedance actuating means to said indicator carriage, a cam shaped in accordance with the indications to be produced, and means cooperating with said cam and indicator for imparting a corrective motion to said indicator whereby substantially accurate indications are produced.

2. In a radio apparatus, the combination of a tuning device, a longitudinal scale indicating the resonant frequency range of said tuning device, an indicator which cooperates therewith in a path parallel to said scale, means for actuating said tuning device and said indicator, a cam having a surface shaped in accordance with the indications to be produced, and means including a cam follower and lever for imparting a corrective motion to said indicator when actuated to indicate correctly the resonant frequency.

3. An apparatus for indicating the resonant frequency of a tuned circuit including means for actuating a variable impedance element in said tuned circuit, a longitudinal surface provided with indicia representing resonant frequences, a movable indicator carriage and a movable indicator which cooperates with said scale, means for transferring motion from said impedance actuating means to said indicator carriage, a cam and cam follower for imparting additional motion to said indicator, said cam having an adjustable surface whereby the motion imparted by the cam follower to said indicator provides correct indication of the resonant frequencies of said tuned circuit.

4. In an apparatus for indicating the resonant frequency of an electrical circuit, a variable impedance member, the combination of a longitudinal scale of frequencies, an indicator carriage movable parallel thereto, an indicator mounted on said carriage and movable with respect thereto, means cooperating with the variable impedance member for actuating said indicator carriage, a cam having an adjustable surface, and means cooperating with said cam to impart a corrective motion to said indicator whereby substantially accurate indication of the resonant frequency is obtained.

5. In a radio receiver, the combination of a rotatable tuning element for changing the frequency to which the receiver is responsive, a longitudinal scale having indicia thereon representing the frequency range of said receiver, an indicator means cooperating with said scale, a cam having a micrometrically adjustable surface shaped in accordance with the indications to be produced, means including a cam follower and lever cooperating with said indicator means and cam, and means for rotating said tuning element and actuating said indicator means, whereby said cam follower and lever means impart a micrometric motion to said indicator thereby to indicate correctly the resonant frequency of said receiver.

6. In a radio receiver, the combination of a rotatable tuning element for determining the resonant frequency of said radio receiver, a longitudinal scale having indicia thereon representing resonant frequences of said radio receiver, an indicator means cooperating with said scale in a path parallel thereto, a cam having a micrometrically adjustable surface, means for rotating said tuning element, means for converting the rotary motion of said tuning element into a longitudinal motion to actuate said indicator means, means cooperating with said cam and said indicator means for imparting a micrometric motion to said indicator, said cam being adjusted to provide accurate indication of the resonant frequency of said radio receiver.

7. An indicating mechanism for radio apparatus including a longitudinal scale, a movable indicator carriage, a support for said indicator carriage parallel to said scale, an indicator mounted on said carriage and movable with respect thereto, a cam, a cam follower and lever mounted on said carriage and cooperating with said indicator whereby a corrective motion is imparted to said indicator as said carriage is moved along the support.

In witness whereof, we have hereunto set our hands.

NEVELL R. JONES.
WALLACE W. DEWHURST.